(12) United States Patent
Orea

(10) Patent No.: US 8,766,471 B2
(45) Date of Patent: Jul. 1, 2014

(54) ENERGY GENERATION APPARATUS FOR SHIPS

(71) Applicant: Francisco Orea, Veracruz (MX)

(72) Inventor: Francisco Orea, Veracruz (MX)

(*) Notice: Subject to any disclaimer, the term of this patent is extended or adjusted under 35 U.S.C. 154(b) by 15 days.

(21) Appl. No.: 13/766,611

(22) Filed: Feb. 13, 2013

(65) Prior Publication Data

US 2014/0077498 A1 Mar. 20, 2014

Related U.S. Application Data

(60) Provisional application No. 61/702,132, filed on Sep. 17, 2012.

(51) Int. Cl.
| | | |
|---|---|---|
| *F03B 13/00* | (2006.01) | |
| *H02P 9/04* | (2006.01) | |
| *F01D 15/10* | (2006.01) | |
| *F02C 6/00* | (2006.01) | |

(52) U.S. Cl.
USPC ............... 290/54; 290/52; 290/55; 290/58; 415/35; 440/38; 440/42

(58) Field of Classification Search
CPC ... B63H 21/20; Y02T 70/5236; B60W 10/08; Y02E 10/725; Y02E 10/223; Y02E 10/226; Y02E 10/28; F03B 15/04; F03B 17/06; H02N 2/18
USPC .......... 290/52, 54, 55, 58; 415/35; 440/38, 42
See application file for complete search history.

(56) References Cited

U.S. PATENT DOCUMENTS

| | | | | |
|---|---|---|---|---|
| 1,375,601 | A * | 4/1921 | Morize ............................. | 60/264 |
| 1,665,053 | A * | 4/1928 | Carpio ............................. | 440/42 |
| 1,849,731 | A | 3/1932 | Nakatani et al. ................. | 440/8 |
| 2,616,385 | A * | 11/1952 | Woods ............................. | 440/38 |
| 2,764,954 | A | 10/1956 | Oeltgen ............................ | 440/40 |
| 3,155,065 | A * | 11/1964 | Strumskis ......................... | 114/122 |
| 3,209,717 | A * | 10/1965 | Campbell et al. ............... | 114/151 |
| 3,556,239 | A * | 1/1971 | Spahn .......................... | 180/65.25 |
| 3,779,200 | A * | 12/1973 | Hull ................................. | 440/42 |
| 3,876,925 | A * | 4/1975 | Stoeckert ......................... | 322/1 |
| 4,179,007 | A * | 12/1979 | Howe .............................. | 180/2.2 |
| 4,254,843 | A * | 3/1981 | Han et al. ...................... | 180/165 |
| 4,314,160 | A | 2/1982 | Boodman et al. ............... | 290/55 |
| 4,392,063 | A * | 7/1983 | Lindquist ......................... | 290/54 |
| 4,477,040 | A * | 10/1984 | Karanik ........................... | 244/58 |
| 4,555,637 | A * | 11/1985 | Irvine .............................. | 290/52 |
| 4,756,698 | A * | 7/1988 | Gorg ................................ | 440/38 |
| 4,868,408 | A * | 9/1989 | Hesh ................................ | 290/52 |

(Continued)

FOREIGN PATENT DOCUMENTS

CN 201358875 Y 3/2009

OTHER PUBLICATIONS

Translation of abstract of CN201358875Y.

*Primary Examiner* — Pedro J Cuevas
(74) *Attorney, Agent, or Firm* — J. Charles Dougherty

(57) ABSTRACT

A system for recapturing energy from a ship moving through the water utilizes a hydraulic turbine positioned within the ship's hull. Water pushed up from the bow of the ship is fed into a water conducting tube and used to drive the turbine. The turbine may produce electricity for powering on-board systems or may be used to augment the main propulsion system, thereby reducing energy costs for ship operations.

17 Claims, 2 Drawing Sheets

(56) References Cited

U.S. PATENT DOCUMENTS

| | | | |
|---|---|---|---|
| 5,141,173 A * | 8/1992 | Lay | 244/2 |
| 5,142,870 A * | 9/1992 | Angle | 60/668 |
| 5,280,827 A * | 1/1994 | Taylor et al. | 180/165 |
| 5,287,004 A * | 2/1994 | Finley | 290/55 |
| 5,296,746 A * | 3/1994 | Burkhardt | 290/55 |
| 5,680,032 A * | 10/1997 | Pena | 290/52 |
| 5,746,283 A * | 5/1998 | Brighton | 180/65.31 |
| 5,850,108 A * | 12/1998 | Bernard | 290/54 |
| 6,270,309 B1 * | 8/2001 | Ghetzler et al. | 415/35 |
| 6,309,266 B1 | 10/2001 | Burke | 440/68 |
| 6,373,145 B1 * | 4/2002 | Hamrick | 290/44 |
| 6,700,215 B2 * | 3/2004 | Wu | 290/44 |
| 6,838,782 B2 * | 1/2005 | Vu | 290/55 |
| 6,857,492 B1 * | 2/2005 | Liskey et al. | 180/165 |
| 6,882,059 B1 * | 4/2005 | DePaoli | 290/44 |
| 7,135,786 B1 * | 11/2006 | Deets | 290/55 |
| 7,174,842 B1 * | 2/2007 | Lin | 114/151 |
| 7,615,883 B2 * | 11/2009 | Meheen | 290/55 |
| 7,665,554 B1 * | 2/2010 | Walsh | 180/2.2 |
| 7,851,936 B2 * | 12/2010 | Bolin | 290/54 |
| 7,982,328 B2 * | 7/2011 | Huntemann | 290/55 |
| 7,984,684 B2 * | 7/2011 | Hinderks | 114/274 |
| 8,070,544 B2 * | 12/2011 | Roman | 441/74 |
| 8,075,354 B2 | 12/2011 | Packard | 440/3 |
| 8,288,882 B2 * | 10/2012 | Bolin | 290/54 |
| 8,434,574 B1 * | 5/2013 | York et al. | 180/2.2 |
| 8,436,485 B1 * | 5/2013 | Smith | 290/55 |
| 8,653,688 B2 * | 2/2014 | Justak et al. | 290/55 |
| 8,659,180 B2 * | 2/2014 | Earl | 290/54 |
| 8,678,310 B2 * | 3/2014 | Masoudipour et al. | 244/58 |
| 2002/0122717 A1 * | 9/2002 | Ghetzler et al. | 415/35 |
| 2003/0052487 A1 | 3/2003 | Weingarten | 290/54 |
| 2008/0141921 A1 * | 6/2008 | Hinderks | 114/274 |
| 2011/0127774 A1 | 6/2011 | Van Schepdael et al. | 290/52 |
| 2012/0227389 A1 * | 9/2012 | Hinderks | 60/317 |
| 2012/0292911 A1 * | 11/2012 | Bolin | 290/54 |

* cited by examiner

ENERGY GENERATION APPARATUS FOR SHIPS

CROSS-REFERENCE TO RELATED APPLICATIONS

This application claims the benefit of U.S. provisional patent application No. 61/702,132, filed on Sep. 17, 2012, and entitled "Apparatus for Use of Inertia of Water Flow to Produce Electricity." Such application is incorporated by reference in its entirety.

STATEMENT REGARDING FEDERALLY SPONSORED RESEARCH OR DEVELOPMENT

Not applicable.

BACKGROUND OF THE INVENTION

A well-known phenomenon associated with watercraft of all sizes is that the movement of the hull of the craft through the water results in resistance and drag, since the water must be pushed aside as the boat moves forward. The effect is to increase the energy necessary to push the craft forward through the water, the effect becoming greater as the ship increases in size. The "wetted area" of a ship (the portion of the hull that is below the water line) is a factor in the drag caused by the ship, and thus ships having a larger wetted area produce more drag. Furthermore, traditional hull designs with a pointed bow cause a wave to form immediately adjacent the bow as the ship moves through the water, which also increases resistance since the ship must proceed through the wave it has created. This effect is also increased with larger ships. All of these factors together cause a significant decrease in the efficiency of a ship's engines, as resistance and drag must be overcome in order to push the ship forward, the loss of efficiency being greatest with the largest ships.

One well-known approach to reduce the resistance of a large ship passing through the water is the "bulbous bow" hull design. This design incorporates a protruding bulb at the bow of the ship, typically just below the waterline. The bulb forces water to flow up over the bulb as the ship moves through the water. The bulbous bow is designed so that the trough of water flowing off the bulb partially cancels out the bow wave caused by the ship, thereby reducing the ship's wake, and thus reducing the ship hull's resistance as it moves through the water. Although producing this additional wave causes an energy loss, the energy loss is more than compensated for by the reduction in drag caused by damping the wave formed by the bow as it passes through the water. The bulbous bow design is of most benefit to the largest ships traveling at high speeds, since these ships experience the most drag due to the presence of the bow wave. Smaller ships may not benefit, since the increase in wetted area—and thus increased resistance—may be greater than the reduction in drag caused by the reduction of the bow wave.

It may be seen that even when a bulbous bow is employed there remains a large loss of energy as a ship moves through the water, due to the effects described above. The inventor hereof has recognized that it would be desirable to recapture some of this energy in order to provide power to a ship, whether to provide on-board electricity, to augment propulsion, or both. One attempt to capture this lost energy is described in U.S. Pat. No. 8,075,354 to Packard. This patent teaches a marine vessel with a submerged front rotor/turbine that purportedly shields the vessel hull from some of the resistance force of the water, while extracting hydrodynamic energy from displaced water that results from the vessel's motion through the water. It is the inventor's belief, however, that this apparatus would be impractical, since the rotor/turbine extends forward of the bow of the ship, where it would be easily damaged by ice, tugboats, docks, or other solid objects that the ship may contact during normal operation. Repair and maintenance for this device would require underwater work or, more likely, dry docking for the ship, which is very expensive. In light of these clear disadvantages, a practical system that effectively captures some of the energy lost due to a ship's movement through the water to either power electrical devices on the ship or augment propulsion, or both, would be highly desirable. A system such as this that is particularly suited for use with a bulbous bow would be of particular desirability, since ships with a bulbous bow tend to be among the largest, fastest ships and are often used for trans-ocean voyages, and thus such ships would reap the greatest gain by capturing a part of this energy loss.

References mentioned in this background section are not admitted to be prior art with respect to the present invention.

BRIEF SUMMARY OF THE INVENTION

The present invention is directed to a system for recapturing energy that results from a ship moving through the water and producing electrical or mechanical energy therefrom, which may be used to power electrical appliances on the ship, charge batteries, augment propulsion power, or some combination of these tasks. The invention incorporates a hydraulic turbine, but the turbine is fitted within a chamber inside the ship's hull, and thus there are no external components of the design that may be damaged by the collision of the ship with an underwater object. Also, because all parts of the system are within the ship's hull, maintenance and repair does not require dry dock or any underwater work by technicians. Rotation of the blades of the hydraulic turbine due to the movement of the ship through the water results in the production of mechanical or electrical energy. Although not limited thereto, in certain embodiments the invention utilizes the wave produced by a bulbous bow design ship to force water through an intake valve and toward the hydraulic turbine, increasing the efficiency of the design.

In one aspect, the invention is directed to an energy generation apparatus for ships, comprising at least one water intake, a water conducting tube passing through a hull of the ship and connecting to the water intake, a hydraulic turbine positioned within the water conducting tube, a water intake valve positioned in the water conducting tube between the water intake and the hydraulic turbine and configured to control the flow of water to the hydraulic turbine from the water intake, and a hydraulic turbine discharge valve positioned in the water conducting tube downstream of the hydraulic turbine and configured to control the flow of water from the hydraulic turbine to a water outlet connected to the water conducting tube at a stern of the ship.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
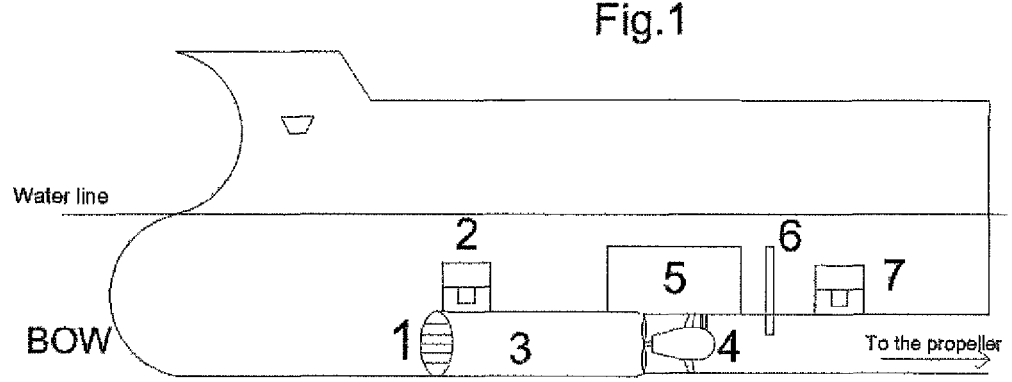
FIG. 1 is a side elevational view in cut-away of a ship hull according to a preferred embodiment of the present invention.

With reference to FIG. 1, the preferred embodiment of the present invention may be described. The preferred embodiment is for use with a bulbous bow hull design, but in alternative embodiments traditional hull designs may be used as well. As shown in FIG. 1, water intake 1 is positioned adjacent to and downstream of the bulbous portion of the bow, whereby as water is pushed around the bulb portion of the bow due to forward movement of the ship, the water is directed toward water intake 1. Although only one water intake 1 is shown in FIG. 1, the preferred embodiment may encompass two water intakes 1, with one of each being positioned at each side of the ship downstream of the bulb. Alternatively, a single intake could be positioned at the bottom of the ship's hull, above the bulb portion of the bow, or there could be numerous smaller water intakes 1 in various positions around the bulb. Water passing into water intake 1 is directed through water conducting tube 2, which in the preferred embodiment may be cylindrical, but could be of any other shape as desired or as fitting with existing equipment contained within the hull of the ship. The outlet of water conducting tube 2 is positioned upstream of the drive propeller or propellers of the ship (not shown), at or near the stern of the ship and below the waterline.

Fitted within water conducting tube 2 is hydraulic turbine 4. Hydraulic turbine 4 may be of any of many known types that are used for applications such as hydroelectric dams, low-head hydro power, and various marine applications. A Kaplan turbine is the preferred type due to its variable-pitch blades, which is important for reasons as will be explained following, but other types of turbines may be used in alternative embodiments, including Francis turbines, bulb-type turbines, and others. Generally speaking, hydraulic turbines are a form of rotary engine that takes kinetic energy from moving water and converts it into mechanical rotational energy. A hydraulic turbine has two basic parts. The first is the body of the turbine which supports its weight, which is typically made of high-quality steel for strength and durability. It is connected to the support structure (in this case, the ship superstructure or hull) with braces. The material used to construct the body of the turbine may be zinc anodized for protection against corrosion. The second part of a hydraulic turbine is the rotating part, which generally consists of a stainless steel shaft connected to the body and to which a series of blades are attached. The turbine is driven by means of an inner shaft that may alter the angle of the blades with respect to the incoming water in order to maximize the efficiency of the energy capture from the water. The main shaft is usually connected to an electric generator to transform the rotational mechanical energy that is directly output from the hydraulic engine into electrical energy.

The movement of water through water conducting tube 2 is controlled by a series of valves. Water intake valve 3 is positioned downstream of water intake 1, between water intake 1 and hydraulic turbine 4. Thus by opening and closing water intake valve 3, the flow of water to hydraulic turbine 4 may be controlled. Likewise, hydraulic turbine discharge valve 7 is positioned downstream of hydraulic turbine 4 and upstream of the outlet of water conducting tube 2, and may be opened or closed to allow or block water from flowing at the downstream side of hydraulic turbine 4. Flow control valve 8 is also positioned downstream of hydraulic turbine 4. The function of flow control valve 8 is to provide an atmospheric vent, as will be described following.

It may be seen that by closing both water intake valve 3 and hydraulic turbine discharge valve 7, water is prevented from entering water conducting tube 2. Thus should any repair of maintenance be required with respect to hydraulic turbine 4, the operator of the ship need only close water intake valve 3 and hydraulic turbine discharge valve 7, and pump out any remaining water with any of various pumping systems as are well known in the art. Access to water conducting tube 2 may be provided by one or more water-tight manholes and hatches that seal water conducting tube 2 during operation, but allow easy access while hydraulic turbine 4 is not in use and water conducting tube 2 is drained. It may be seen that maintenance and repair in this manner may be easily performed even when the ship is at sea and far from any port, and in fact the ship may even be under full power while such maintenance or repair takes place.

Figure 2:
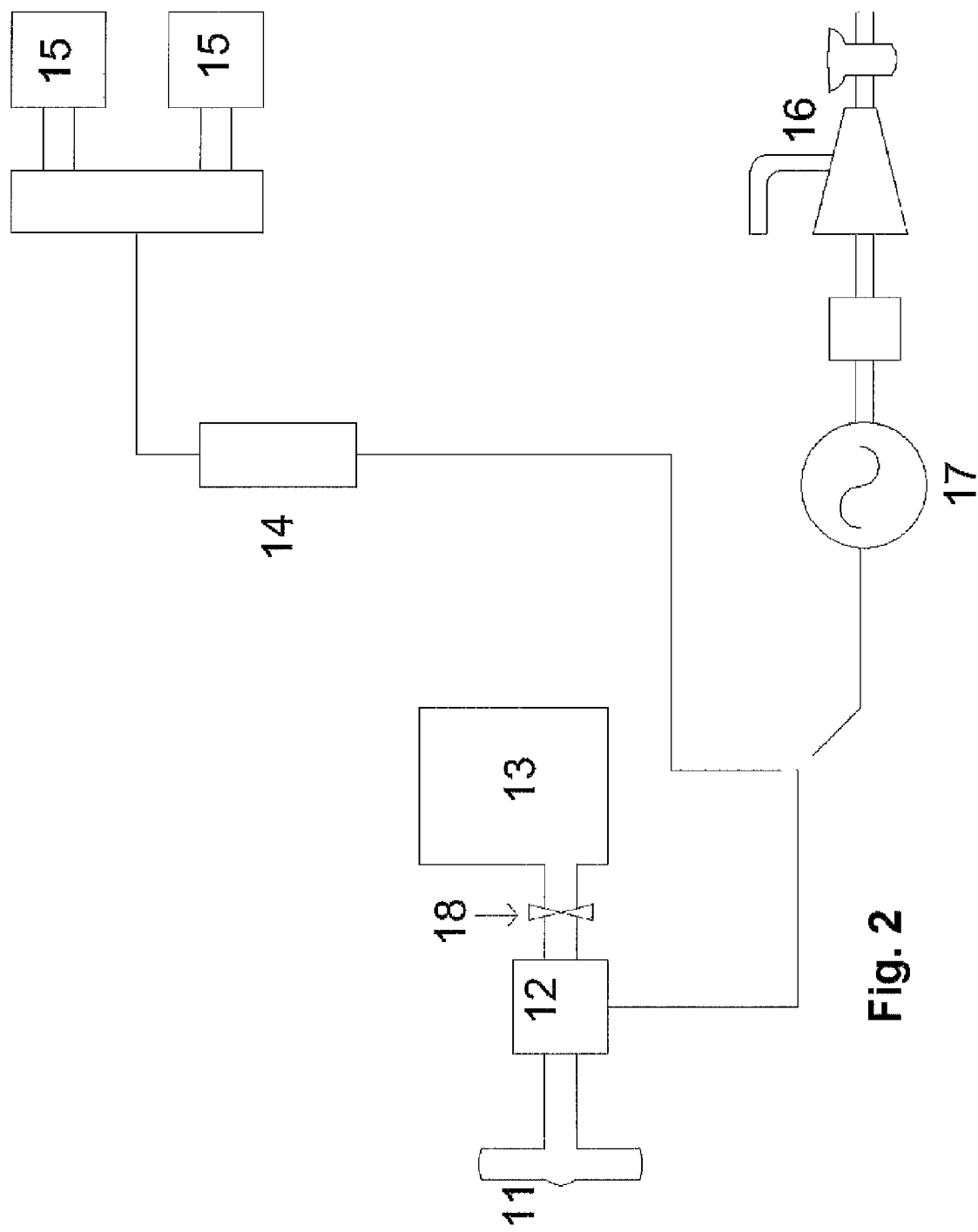
FIG. 2 is an electrical schematic according to a preferred embodiment of the present invention.

Turning now to the schematic of FIG. 2, the operational layout of the preferred embodiment of the present invention may now be described. Propeller 11, which as previously explained can be multiple propellers in various alternative embodiments, is positioned at the aft of the ship for main propulsion. It is driven primarily by diesel engine 13; while diesel engines are the most common power plant of large ships, other types of motors are within the scope of the invention. Hydraulic turbine assembly 16 (which includes hydraulic turbine 4 from FIG. 1) is connected to electric generator 17, whereby mechanical rotational energy from hydraulic turbine assembly 16 is converted into electrical energy. This power, in the preferred embodiment, is utilized by the ship in two ways. The electrical energy is delivered to electric panel distributor to augment the electrical power provided throughout the ship by marine generator set 15. Such electrical power is used for lighting, heating/cooling, radar, radio communications, and many other functions as normally conducted onboard a ship. This power could also be used to charge batteries, as may be used for various purposes. Electrical energy from electric generator 17 is also delivered to electric motor 12, which augments the power delivered to propeller 11 by diesel engine 13 in order to provide main propulsion for the ship. A hydraulic/electric clutch 18, many types of which are well known in the art, provides controllable engagement and disengagement between diesel engine 13 on the one hand and electric motor 12 and propeller 11 on the other. It may be seen that energy derived from the flow of water at water turbine assembly 16 is used to augment both electrical power on board the ship as well as main propulsion. The result is a savings in the use of fossil fuels to power the diesel motors of the ship. By reducing the use of fossil fuels, the cost of operating the ship may be lowered, as well as reducing pollution and carbon emissions that are created by the operation of the diesel engines. The power produced by water turbine assembly 16 is, as will be readily recognized, a "green" source of energy for the ship, since no pollution or carbon emissions are generated by the operation of water turbine assembly 16. If batteries are charged as a result of the power delivered at water turbine assembly 16, then the system may provide power even when water turbine assembly 16 is not in operation, as when the ship is stationary or when maintenance or repairs are being performed.

It should be noted that in order to maximize the efficiency of the system, the blades of hydraulic turbine 4 should be set at an angle that derives the most power from the water passing through water conducting tube 2. This angle will be dependent upon the velocity of water passing hydraulic turbine 4 in water conducting tube 2. Alternatively, if a consistent supply of electricity rather than maximum efficiency is desired, the angle of the blades of hydraulic turbine 4 may be adjusted as the ship speeds up or slows down in order to maintain a constant level of electricity supply. It is believed that due to its simple design, hydraulic turbine 4 will result in a highly efficient delivery of electricity. It is well documented, for example, that hydroelectric power generation is one of the most efficient forms of electricity production. If, as believed, frictional losses due to various parts within water conducting tube 2 amount to about 10% to 15% of the possible energy that could be extracted from the water passing through water conducting tube 2, then the system will have an overall efficiency of about 85% to 90%.

The system according to a preferred embodiment having now been described, the operation of the system may now be set forth. Since the system depends upon the movement of the ship through the water, it will of course not be operational when the ship is stationary. Thus a first step to use of the system is to move the ship to speed, preferably the ship's minimum operational speed. For many oceangoing ships, particularly large tankers, ocean liners, and large warships, the minimum operational speed may be at or near the maximum operational speed. These ships are generally designed to run at their maximum speed for long periods of time. The higher speed will result in greater energy output from the system.

Once the ship is at speed, the next step is to flood water conducting tube 2 while maintaining the blades of hydraulic turbine 4 at an angle of zero degrees, that is, with the blades parallel to the direction of water flow so that no rotation is created by water flowing through hydraulic turbine 4. This is the initial setting to prevent damage to hydraulic turbine 4 that could result if rotation were generated while the chamber is partially filled or filling. To flood water conducting tube 2, hydraulic turbine discharge valve 8 is preferably opened first, and then flow control valve 8 is opened to provide a vent to atmospheric pressure. Without flow control valve 8, it may be seen that there could be dangerous fluctuations of air pressure within water conducting tube 2 during filling and draining operations. Finally, water intake valve 3 is slowly opened, such that water conducting tube 2 is filled with water.

Once water conducting tube 2 is safely filled with water, generation may begin by slowing varying the angle of the blades of hydraulic turbine 4 away from zero degrees. As the blades begin to vary their angle, the movement of water past hydraulic turbine 4 will cause hydraulic turbine 4 to turn. The final desired angle may be based upon the desired production of energy from the system, up to the maximum amount of energy that may be produced by the system given the ship's current speed.

The efficiency of the system in the preferred embodiment is increased by placing the output of water conducting tube 2 just upstream of the main propulsion propeller or propellers of the ship. The propellers create a low-pressure or vacuum effect due to their turning in the water. This low pressure region serves to draw water toward it, as the water naturally moves from a region of higher pressure to lower pressure. Thus with this arrangement the turning of the propulsion propellers serves to draw water through water conducting tube 2, providing a slightly greater volume of water passing through water turbine 4 over any particular time period than would otherwise be possible. Since the speed of water passing through water turbine 4 determines the maximum electrical energy output of the system, the overall efficiency of the system may thus be increased.

Certain ranges may have been provided in the description of these particular embodiments with respect to certain parameters. When a range of values is provided, it should be understood that each intervening value between the upper and lower limit of that range and any other stated or intervening value in that stated range is encompassed within the invention, subject to any specifically excluded limit in the stated range. Where the stated range of values includes one or both of the limits, ranges excluding either or both of those limits are also included in the scope of the invention.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. As used herein, "consisting of" excludes any element, step, or ingredients not specified in the claim element. As used herein, "consisting essentially of" does not exclude materials or steps that do not materially affect the underlying novel characteristics of the claim. When a Markush group or other grouping is used herein, all individual members of the group and all combinations and subcombinations possible of the group are intended to be individually included in the disclosure. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

The invention claimed is:

1. An energy generation apparatus for ships, comprising:
   a. at least one water intake;
   b. a water conducting tube passing through a hull of the ship and connecting to the at least one water intake;
   c. a hydraulic turbine positioned within the water conducting tube;
   d. a water intake valve positioned in the water conducting tube between the at least one water intake and the hydraulic turbine and configured to control the flow of water to the hydraulic turbine from the at least one water intake; and
   e. a hydraulic turbine discharge valve positioned in the water conducting tube downstream of the hydraulic turbine and configured to control the flow of water from the hydraulic turbine to at least one water outlet connected to the water conducting tube.

2. The energy generation apparatus for ships of claim 1, wherein the at least one water intake is placed at a bow of the ship.

3. The energy generation apparatus for ships of claim 1, wherein the at least one water intake is placed adjacent a bow of the ship.

4. The energy generation apparatus for ships of claim 2, wherein the bow is a bulbous bow comprising a bulb, and further wherein the at least one water intake is positioned adjacent to the bulb whereby at least a portion of a wave of water passing over the bulbous bow is delivered into the at least one water intake.

5. The energy generation apparatus for ships of claim 4, wherein the hydraulic turbine is mechanically linked to a propulsion unit of the ship and is configured to augment the propulsion unit of the ship.

6. The energy generation apparatus for ships of claim 4, wherein the hydraulic turbine is connected to an electrical generator configured to produce electricity as a result of rotation of the hydraulic turbine.

7. The energy generation apparatus for ships of claim 6, wherein the electrical generator is electrically connected to at least one onboard electrical device to produce power to operate the onboard electrical device.

8. The energy generation apparatus for ships of claim 6, wherein the electrical generator is electrically connected to at least one onboard electrical battery to charge the electrical battery.

9. The energy generation apparatus for ships of claim 6, wherein the electrical generator is electrically connected to a propulsion unit of the ship to augment the propulsion unit of the ship.

10. The energy generation apparatus for ships of claim 4, wherein the hydraulic turbine comprises a plurality of blades, and further wherein the plurality of blades comprise an angle adjustment mechanism operable to change the angle of the blades with respect to water passing through the water conducting tube.

11. The energy generation apparatus for ships of claim 4, further comprising:
 a. at least one manhole providing access to the water conducting tube from within the hull, wherein the at least one manhole is sealed with a closeable water-tight hatch; and
 b. at least one pump hydraulically connected to the water conducting tube and operable to drain the water conducting tube of water when the water intake valve and the hydraulic turbine discharge valve are closed.

12. The energy generation apparatus for ships of claim 6, further comprising an electrical distribution panel electrically connected to the electrical generator.

13. The energy generation apparatus for ships of claim 12, further comprising an electrical motor connected to the electrical generator, wherein the electrical motor is configured to augment drive delivered to at least one propulsion propeller.

14. The energy generation apparatus for ships of claim 13, further comprising:
 a. at least one main diesel engine connected to and configured to drive the at least one propulsion propeller; and
 b. a hydraulic/electric clutch configured to selectively engage and disengage the at least one main diesel engine with the at least one propulsion propeller.

15. The energy generation apparatus for ships of claim 4, wherein the water conducting tube comprises an outlet positioned upstream of at least one main propulsion propeller of the ship whereby water passing through the water conducting tube is directed toward the at least one main propulsion propeller of the ship.

16. The energy generation apparatus for ships of claim 4, further comprising a flow control valve passing through the water conducting tube and operable to vent the water conducting tube to the atmosphere.

17. The energy generation apparatus for ships of claim 16, wherein the flow control valve is positioned on the water conducting tube downstream of the water turbine.

\* \* \* \* \*